United States Patent [19]
Wu

[11] Patent Number: 5,488,679
[45] Date of Patent: Jan. 30, 1996

[54] POLARIZATION INDEPENDENT WAVELENGTH TUNABLE FILTER BASED ON BIREFRINGENCE COMPENSATION

[75] Inventor: Chi Wu, Crescent, Canada

[73] Assignee: Northern Telecom Limited, Quebec, Canada

[21] Appl. No.: 329,923

[22] Filed: Oct. 27, 1994

[51] Int. Cl.$^6$ .............................. G02B 6/26; G02B 6/00
[52] U.S. Cl. .................. 385/15; 385/11; 385/27; 385/28; 385/37; 385/40; 385/122; 385/131; 385/132; 385/141
[58] Field of Search ................. 385/10, 11, 15, 385/16, 27, 28, 37, 40, 41, 42, 131, 132, 122, 141, 142, 143, 144, 145

[56] References Cited

U.S. PATENT DOCUMENTS

| | | | |
|---|---|---|---|
| 4,840,446 | 6/1989 | Nakamura et al. | 385/131 |
| 5,005,933 | 4/1991 | Shimuzu | 385/122 |
| 5,090,790 | 2/1992 | Zucker | 385/130 |
| 5,117,469 | 5/1992 | Cheung et al. | 385/11 |
| 5,446,807 | 8/1995 | Baran et al. | 385/11 |

OTHER PUBLICATIONS

"Directional Couplers Made of Nonidentical Asymmetric Slabs. Part I: Synchronous Couplers", D. Marcuse, Journal of Lightwave Technology, vol. LT–5, No. 1, Jan. 1987, pp. 113–118.
"Polarization–Independent WDM Channel Dropping Filters", Deri et al, 20th European Conference on Optical Communication, Firenze (Italy), Sep. 26–30, 1994, pp. 415–418.
"InGaAsP/InP Vertical Directional Coupler Filter with Optimally Designed Wavelength Tunability", Chi Wu et al, IEEE Photonics Technology Letters, vol. 4, No. 4, Apr. 1993.
"Bandwidth of Forward and Backward Coupling Directional Couplers", D. Marcuse, Journal of Lightwave Technology, vol. LT–5, No. 12, Dec. 1987, jpp. 1773–1777.
"A Novel Integrated Optics Wavelength Filter in InGaAsP–InP", Broberg et al, Journal of Lightwave Technology, vol. LT–4, No. 2, Feb. 1986, pp. 196–203.
"Tunable Optical Waveguide Directional Coupler Filter", Alferness et al, Appl. Phys. Lett. 33(2), 15 Jul. 1978, pp. 161–163.
"Optical Birefringence of Thin GaAs–AlAs Multilayer Films", van der Ziel et al, Applied Physics Letters, vol. 28, No. 12, Jun. 1976, pp. 735–737.
"A Vertically Coupled InGaAsP/InP Directional Coupler Filter of Ultranarrow Bandwidth", Chi Wu et al, IEEE Photonics Technology letters, vol. 3, No. 6, Jun. 1991, pp. 519–521.

Primary Examiner—Brian Healy
Attorney, Agent, or Firm—George MacGregor

[57] ABSTRACT

A polarization independent wavelength tunable filter in the form of a dual-waveguide directional coupler. The conditions necessary to achieve coupling of a selected wavelength including both TE and TM polarization modes from one waveguide to a second waveguide in close proximity are achieved through a combination of geometrical and compositional tailoring of the waveguides and birefringence compensation in the waveguide and coupling layer.

23 Claims, 5 Drawing Sheets

POLARIZATION INDEPENDENT WAVELENGTH TUNABLE FILTER BASED ON BIREFRINGENCE COMPENSATION

FIELD OF INVENTION

The invention relates to tunable filters and more particularly to polarization independent wavelength tunable filters having birefringence compensation.

BACKGROUND

Tunable filters are important elements in integrated optical transmission and switching systems. Specifically, tunable filters at the receiver end of such systems can be used to selectively separate each of the multi-wavelengths sent by the transmitters. In a multi-wavelength transmission system, such transmitters can be made of either multi-wavelength laser arrays or tunable lasers. These multi-wavelength laser arrays or tunable lasers can be used to impart modulated signal chains on different wavelength carriers and these signals are multiplexed into a single mode optical fiber. At the receiver end these wavelength division multiplexed (WDM) signals are demultiplexed using a wavelength tunable filter in conjunction with appropriate detectors. The tunable filter which may preferably be in the form of a directional coupler extracts an optical signal of a predetermined wavelength from a plurality of wavelengths propagating through a waveguide.

For a given wavelength propagating through one of a pair of adjacent waveguides there is one set of conditions whereby all of that wavelength will be coupled to the adjacent waveguide. This characteristic is well documented. See for example, D. Marcuse, "Bandwidth of Forward and Backward Coupling Directional Couplers", Journal of Lightwave Technology, Vol. LT.5, NO. 12, December 1987, at page 1773.

It is also known that an optical signal travelling through an optical fiber is subject to variations in polarization state due to the birefringence of conventional single mode optical fibers. Therefore, an optical signal of a given wavelength $\lambda_0$ with single polarization state will have associated with it both TE and TM polarization modes, i.e., $\lambda_0(TE)$ and $\lambda_0(TM)$ after travelling some distance through a fiber. Therefore, it is impossible for a narrow band filter of the prior art to selectively couple both TE and TM modes from one waveguide to the other, since the coupling wavelengths of TE and TM modes are separated as much as 30 nm in such a directional coupler filter with a −3dB bandwidth of 1.5 nm. [See Chi Wu et al, "InGaAs/InP Vertical Directional Coupler Filter with Optimally Designed Wavelength Tunability", IEEE Photonics Technology Letters, Vol. 4, No. 4, April 1993.] For complete and effective coupling of a polarized optical signal with wavelength $\lambda_0$, the following three conditions must be satisfied. These are:

(1) Common central wavelength $\lambda_0$—in other words the central wavelength of the TE mode $\lambda_0^{TE}$ must be equal to the central wavelength of the TM mode ($\lambda_0^{TE}=\lambda_0^{TM}$).
(2) The bandwidth at the −3db points for both modes must be equal, i.e., $\Delta\lambda_{BW}(TE)=\Delta\lambda_{BW}(TM)$ and;
(3) The coupling coefficient for the TE mode must be the same as the coupling coefficient of the TM mode, i.e., $K(TE)=K(TM)$.

SUMMARY OF THE INVENTION

It is an object of the present invention to provide a tunable, polarization independent wavelength filter utilizing birefringence compensation.

It is a further object of the present invention to provide a polarization independent tunable filter employing material compositional and geometrical tailoring to facilitate coupling of both polarization modes from a first waveguide to a second adjacent waveguide.

It is a still further object of the invention to provide the polarization independent filter in semiconductor material and more preferably in III-V alloy material.

Therefore in accordance with the present invention there is provided a polarization independent wavelength tunable filter comprising a first waveguide for receiving an optical signal on at least one wavelength carrier and a second waveguide for receiving from the first waveguide a selected wavelength. A coupling region lies immediately between the two waveguides. According to the invention the physical characteristics of the waveguides and coupling region are tailored so as to facilitate coupling of the selected wavelength from the first waveguide to the second. Preferably, the waveguides and coupling region are fabricated in an epitaxially grown III-V semiconductor alloy. The balancing of propagation constants required to ensure complete coupling of the central wavelength including TE and TM polarization modes is achieved through selection of geometrical configuration, compositional ratios, and birefringence compensation. The birefringence compensation is accomplished by utilizing multi-quantum wells preferably in the coupling layer.

BRIEF DESCRIPTION OF THE DRAWINGS

The invention will now be described in detail with reference to the appended drawings wherein.

DETAILED DESCRIPTION OF THE INVENTION

Figure 1:
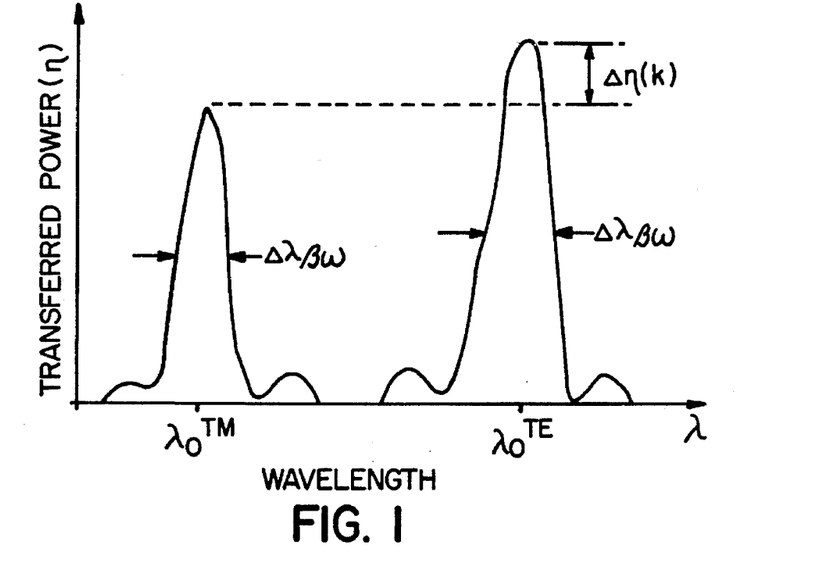
FIG. 1 is a typical transfer function of a conventional narrow bandwidth directional coupler filter showing the relative wavelength, bandwidth and coupling efficiency for TM and TE polarization modes.

As previously discussed an electromagnetic wave of a specific wavelength propagating through an optical fiber will contain orthogonal transverse magnetic (TM) and transverse electric (TE) polarization modes. When such an optical signal is coupled into the directional coupler filter, at the output end, the central wavelengths ($\lambda_0$), bandwidths $\Delta\lambda_{BW}$ and coupling coefficients K of the two modes are different as shown graphically in FIG. 1. In this graph, which depicts relative transferred power versus wavelength shows a difference in wavelength for the TM mode $\lambda_0(TM)$ and the wavelength for the TE mode $\lambda_0(TE)$ which may in practice be as much as 30 nm. Additionally the bandwidth taken at the −3dB points is likely to be different between the two modes as shown in FIG. 1, i.e., $\Delta\lambda_{BW}(TM)$ versus $\Delta\lambda_{BW}(TE)$. Finally, the coupling coefficient, or, the transferred power, is different as indicated by $\Delta\eta(K)$.

It is known that for juxtaposed non-identical waveguides, i.e., guides having different propagation constants $\beta$, there is a distance L at which light of a given wavelength propagating in one of the guides will be transferred to the other. This occurs for a value $$L = \frac{\pi}{(\beta_2 - \beta_1)} \quad \text{(EQ 1)}$$

where $\beta_2$ and $\beta_1$ are the propagation constants of the waveguides.

The propagation constant $\beta$ of a waveguide is dependent on the refractive index n of the material forming the guide and the geometry of the guide. This may be written as $$\beta = \frac{2\pi}{\lambda} n\Gamma = \frac{2\pi}{\lambda} N \quad \text{(EQ 2)}$$

where $\lambda$ is the wavelength of light in the free space and $\Gamma$ is the optical confinement factor and N is the effective refractive index of the waveguide.

The effective refractive index N or the waveguide propagation constants $\beta$ of the waveguide may be tailored by electro-optic means as well as geometrical, compositional and birefringence variations. The present invention contemplates reliance on all of these factors to provide a polarization independent wavelength tunable filter.

Figure 2:
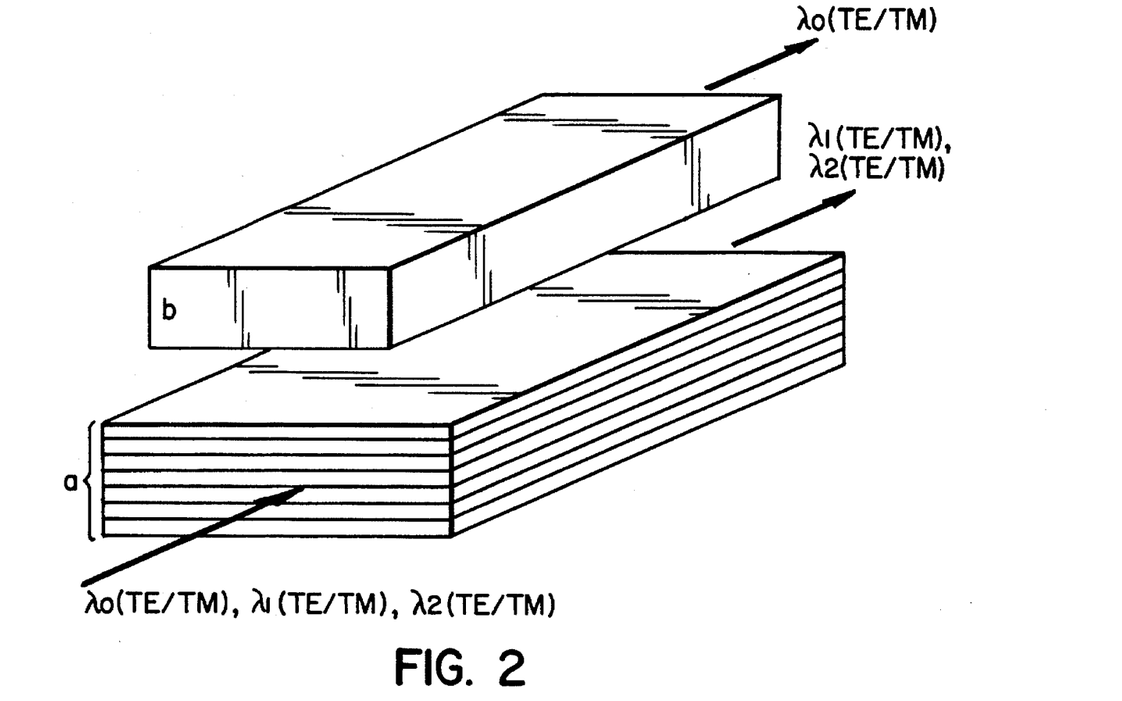
FIG. 2 is a perspective view of a polarization independent tunable filter made of two vertically coupled waveguides, one of which is provided with multi-quantum wells.
Figure 3:
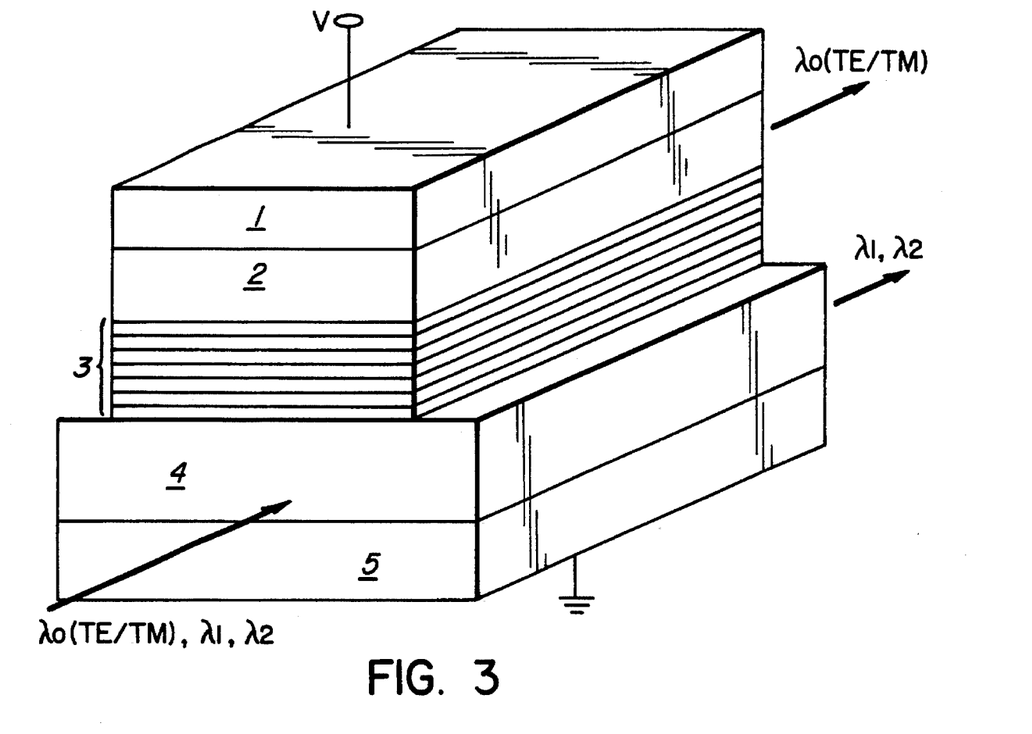
FIG. 3 is a perspective view of a polarization independent wavelength tunable filter based on birefringence compensation.
Figure 4:
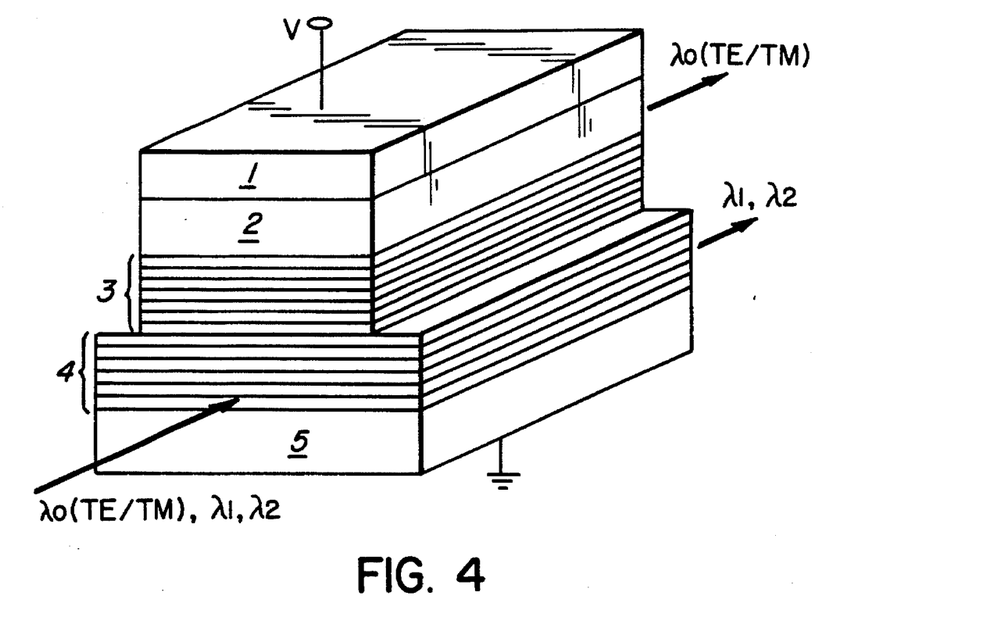
FIG. 4 is a perspective view of the filter of FIG. 3 having multi-quantum-wells in both the coupling layer and the lower waveguide.

FIGS. 2, 3 and 4 are perspective views of waveguide structure according to the invention. In a preferred embodiment the filter is fabricated in III-V alloy material using epitaxial growth techniques such as MOCVD. The InGaAsP/InP system is a particularly suitable alloy although other III-V alloys are contemplated by the invention. In fact, certain II-VI alloys and a Si/Ge alloy are considered as potential materials according to the invention. Alternatively, the essence of the invention may be applied to tunable filter structures fabricated from polymer, glass, silicon and photorefractive material such as $LiNbO_3$, etc.

FIG. 2 is a perspective view of two waveguides, a and b. For simplification, cladding layers and the intermediate coupling layer have not been shown.

As denoted by the arrows an optical signal containing a plurality of wavelengths each with TE and TM polarization modes, $\lambda_0(TE/TM)$, $\lambda_1(TE/TM)$, $\lambda_2(TE/TM)$ is launched into the near end of guide 'a' and at some distance L, wavelength $\lambda_0(TE/TM)$ is coupled to waveguide 'b' while the remainder of the original signal continues to be propagated through guide 'a'. As indicated previously, for this transfer to occur, the propagation constants of the two waveguides must be equal at $\lambda_0$ for both the TE and TM modes. i.e., $\beta_a^{TE}(\lambda_0)=\beta_b^{TE}(\lambda_0)$ and $\beta_a^{TM}(\lambda_0)=\beta_b^{TM}(\lambda_0)$ or written differently:

$$\beta_a^{TE}(\lambda_0)-\beta_b^{TE}(\lambda_0)=\beta_a^{TM}(\lambda_0)-\beta_b^{TM}(\lambda_0)$$

In FIG. 2 waveguide 'b' is shown as being bulk material while waveguide 'a' includes multi-quantum-wells (MQW) as represented by stacked layers. It is to be understood, however, that the invention is not limited to this structure but includes other combinations such as both guides being of bulk material, both guides containing one or more quantum wells and guide 'b' including wells while guide 'a' is of bulk material.

Figure 6:
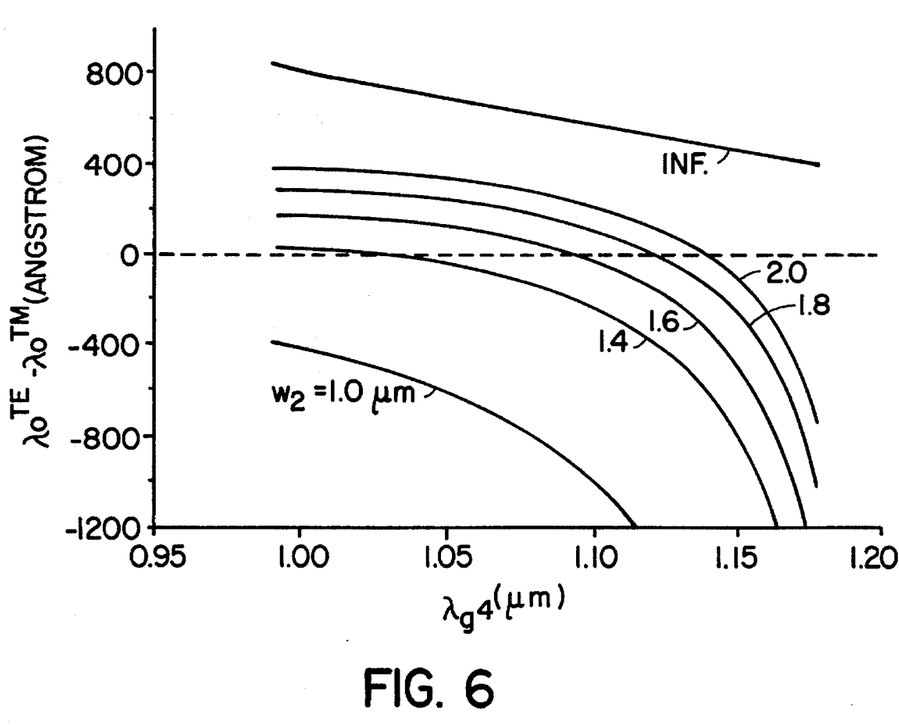
FIG. 6 is a graph of $\lambda_0^{TE}-\lambda_0^{TM}$ versus the compositional bandgap of the lower waveguide in FIG. 3, as a function of the width of the upper waveguide.
Figure 7:
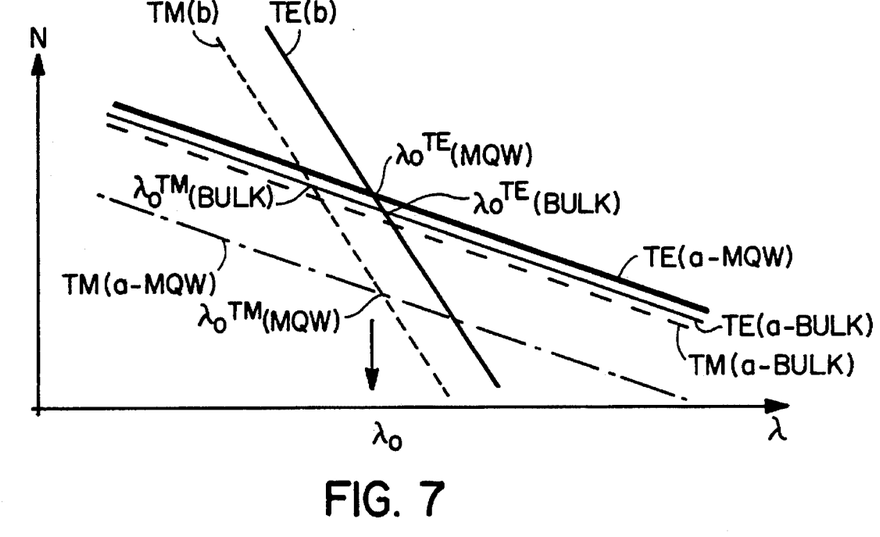
FIG. 7 is a graphical representation of the effective index of refraction vs. wavelength for both TE and TM modes for the waveguides of FIG. 2.

As the propagation constant of each guide is dependent on both the refractive index of the material and the optical confinement factor of the waveguide, it follows that the wavelength $\lambda$ at which coupling occurs is dependent on the effective refractive index N. The relationship between the coupling wavelength of the TE and TM modes for waveguides of bulk material is shown graphically in FIG. 6. It gives a guideline on how to design the directional coupler filter with the same coupling wavelength for both the TE and TM modes. FIG. 6 graphically indicates this relationship in lattice matched InGaAsP/InP material system. In this figure the ordinate is the difference between the central wavelength of TE and TM given as $\lambda_0^{TE}-\lambda_0^{TM}$. The abscissa provides the bandgap wavelength for material composition in waveguide 'a'. The graphs are presented for different widths of waveguide 'b' in μm. The dotted horizontal line is for the condition when $\lambda_0^{TE}=\lambda_0^{TM}$. As one example, it can be noted in this graph that $\lambda_0^{TE}=\lambda_0^{TM}$ when the width of waveguide 'b' is 1.4 μm and the compositional wavelength bandgap of waveguide 'a' is ~1.03 μm. The polarization independent coupling wavelengths can also be achieved using MQW in one of the waveguides as shown in FIG. 2. This is illustrated in FIG. 7, where central wavelength $\lambda_0$ corresponds to the point wherein $N_{TE}^b(\lambda_0)=N_{TE}^{a-MQW}(\lambda_0)$ and $N_{TM}^b(\lambda_0)=N_{TM}^{a-MQW}(\lambda_0)$. Thus the first condition set out hereinbefore is satisfied.

FIG. 7 illustrates the working principle of FIG. 2, where waveguide 'a' has MQWs and waveguide 'b' uses bulk material.

This condition can be realized by tailoring the geometry and/or the material composition (refractive index) of either or both waveguides. The waveguide(s) could be made using either MQWs or bulk material.

The second criteria requires that the bandwidth of each mode be the same, i.e., $\Delta\lambda_{BW}(TE)=\Delta\lambda_{BW}(TM)$.

The bandwidth at the −3dB level is determined by the equation:

$$\Delta\lambda_{BW} = \frac{5}{L\delta} \quad \text{(EQ 3)}$$

where L=device length.

Here $\delta = \left| \frac{d\beta a}{d\lambda} - \frac{d\beta b}{d\lambda} \right|$ at $\lambda_0$.

The polarization independent feature requires that $\delta_{TE}(\lambda_0)=\delta_{TM}(\lambda_0)$.

As previously discussed in relation to $\lambda_0^{TE}=\lambda_0^{TM}$, that condition can be satisfied by tailoring geometry and/or material composition of either bulk material waveguides or MQW waveguides. Since MQW induced birefringence gives one more freedom for device design, it is also possible to achieve the required $\delta_{TE}(\lambda_0)=\delta_{TM}(\lambda_0)$ while still keeping the $\lambda_0^{TE}=\lambda_0^{TE}$ relationship by appropriate geometrical selection in combination with compositional variations of both the bulk and MQW waveguides. Thus, by optimally designing the device geometry and the material composition both the central wavelength and the bandwidth requirement can be satisfied.

FIG. 3 is a perspective view of a tunable filter wherein the waveguides are shown to be of bulk material and the coupling layer includes multi-quantum-wells. In this configuration 1 and 5 are the cladding layers, 2 and 4 are the guiding layers and 3 is the coupling layer. For the sake of the following discussion it is to be assumed that the refractive index n of layer 2 is greater than n for layer 4 which in turn is greater than n for layer 1, 3 or 5. Layer 2 is waveguide 'b' and layer 4 is waveguide 'a'. Layer 1 is P-type material while layer 2 is undoped. Layer 3, the coupling layer, is N-type and is shown to include multi-quantum-wells. Layer 4, guide 'a', is N-type as is the lower cladding layer 5. Contacts are added to both the top and bottom faces to facilitate the application of a tuning bias voltage or current.

FIG. 4 illustrates the configuration which is best suited to effect the three conditions referred to earlier. In this structure one of the two waveguides, guide 'a' for convenience, and the coupling layer C include MQWs. It is, of course, within the scope of the invention to place the MQWs in waveguide 'b' rather than waveguide 'a'.

From a practical point of view the most difficult condition of the aforementioned set of criteria to achieve is to have the TE and TM modes have the same coupling coefficient, i.e., $K_{TE}(\lambda_0)=K_{TM}(\lambda_0)$.

The coupling coefficients for the 'a' and 'b' waveguides respectively are given by $$K_a = \frac{2\pi}{\lambda_0} \int_s (n_a - n_s) E_a E_b ds$$

and $$K_b = \frac{2\pi}{\lambda_0} \int_s (n_b - n_s) E_a E_b ds$$

where
$\lambda_0$=central wavelength
$n_a$=refractive index of waveguide 'a'
$n_b$=refractive index of waveguide 'b'
$n_s$=refractive index of coupling layer
$E_a$=electric field of waveguide 'a'
$E_b$=electric field of waveguide 'b'.

Coupling coefficients as applied to polarization modes in the case of a dual waveguide directional coupler is discussed by Dietrich Marcuse, "Directional Couplers Made of Non-identical Asymmetric Slabs. Part 1: Synchronous Couplers", Journal of Lightwave Technology, Vol. LT.5, No. 1, January 1987, pp. 113–118. In that paper Dr. Ing Marcuse develops the equations for K(TE) and K(TM) respectively. These may be written in relation to the filter of FIG. 2 as follows:

$$K(TE) = \frac{2p_2 p_4 \gamma_3 e^{-2d_3\gamma_3}}{k_0^2 \beta_0 \sqrt{(n_2^2 - n_3^2)(n_4^2 - n_3^2)(d_2 + 1/\gamma_1 + 1/\gamma_3)(d_4 + 1/\gamma_3 + 1/\gamma_5)}}$$

where $$k_0 = \frac{2\pi}{\lambda_0} \text{ wave vector}$$

and $$K(TM) = \frac{2n_2 n_3^2 n_4 p_2 p_4 \gamma_3 e^{-2d_3\gamma_3}}{\beta_0 \sqrt{(n_3^4 p_2^2 + n_2^4 \gamma_3^2)(n_3^4 p_4^2 + n_4^4 \gamma_3^2) Q_2 Q_4}}$$

In connection with K(TM):

$$Q_2 =$$

-continued $$d_2 + \frac{n_2^2 n_3^2}{\gamma_3} \frac{p_2^2 + \gamma_3^2}{n_3^4 p_2^2 + n_2^4 \gamma_3^2} + \frac{n_2^2 n_1^2}{\gamma_1} \frac{p_2^2 + \gamma_1^2}{n_1^4 p_2^2 + n_2^4 \gamma_1^2}$$

and $$Q_4 =$$

$$d_4 + \frac{n_4^2 n_3^2}{\gamma_3} \frac{p_4^2 + \gamma_3^2}{n_3^4 p_4^2 + n_4^4 \gamma_3^2} + \frac{n_4^2 n_5^2}{\gamma_5} \frac{p_4^2 + \gamma_5^2}{n_5^4 p_4^2 + n_4^4 \gamma_5^2}$$

Where, $$P_\mu = \sqrt{n_\mu^2 k_0^2 - \beta_\mu^2} \qquad \mu = 2,4$$

and $$\gamma_\nu = \sqrt{\beta_\mu^2 - n_\nu^2 k_0^2} \qquad \nu = 1,3,5$$

are referred to as the extinction coefficient of the guiding layer and the decay constant of the cladding layers, respectively. $n_{\mu,\nu}$ and $\beta_\mu$ are the refractive indices and propagation constants in the corresponding waveguide layers. At the central wavelength $\lambda_0$, we have $$\beta_a(\lambda_0)=\beta_b(\lambda_0)=\beta_0(\lambda_0)$$

Normally, the parameters, $\beta_0$, $\gamma_\nu$ and $P_\mu$ are different for the TE and TM modes:

$$\beta_0^{TE}(\lambda_0)\neq\beta_0^{TM}(\lambda_0), \gamma_\nu^{TE}(\lambda_0)\neq\gamma_\nu^{TM}(\lambda_0), P_\mu^{TE}(\lambda_0)\neq P_\mu^{TM}(\lambda_0)$$

The refractive indices of n are the same for the TE and TM modes in bulk material:

$$n_\mu^{TE}(\lambda_0)=n_\mu^{TM}(\lambda_0) \text{ and } n_\nu^{TE}(\lambda_0)=n_\nu^{TM}(\lambda_0).$$

It is known that multi-quantum-wells or superlattice structures have an effect on the birefringent property of the material. This will give that:

$$n_\mu^{TE}(\lambda_0)\neq n_\mu^{TM}(\lambda_0) \text{ and } n_\nu^{TE}(\lambda_0)\neq n_\nu^{TM}(\lambda_0)$$

This birefringency also affects other parameters, such as $\beta$, P and $\gamma$.

Figure 8:
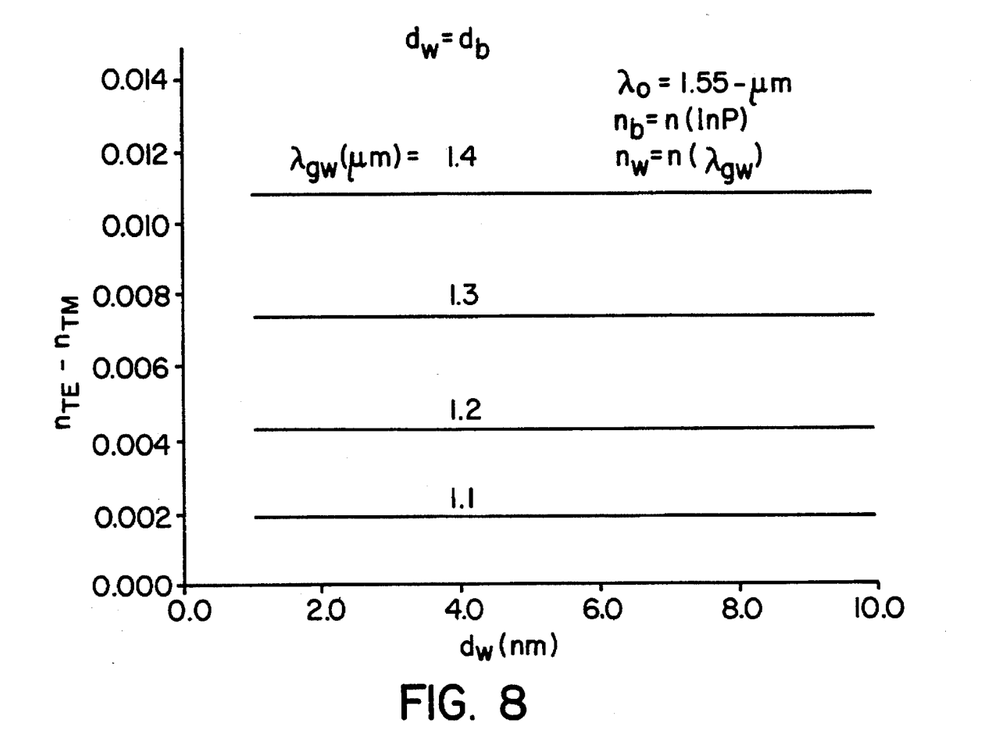
FIG. 8 is a graph of the difference in refraction index for TE and TM modes n(TE)−n(TM) versus wavelength as a function of the compositional bandgap for the quantum wells in the coupling and/or waveguide layer.
Figure 9:
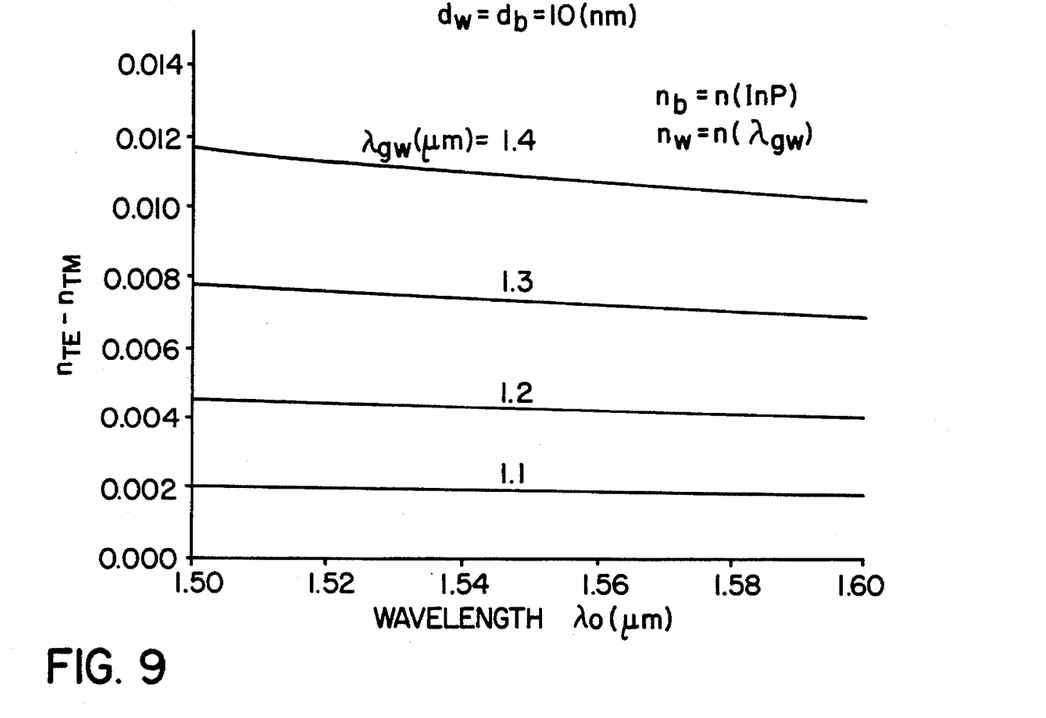
FIG. 9 graphically illustrates n(TE)−n(TM) versus quantum well thickness as a function of quantum well's bandgap wavelength.
Figure 10:
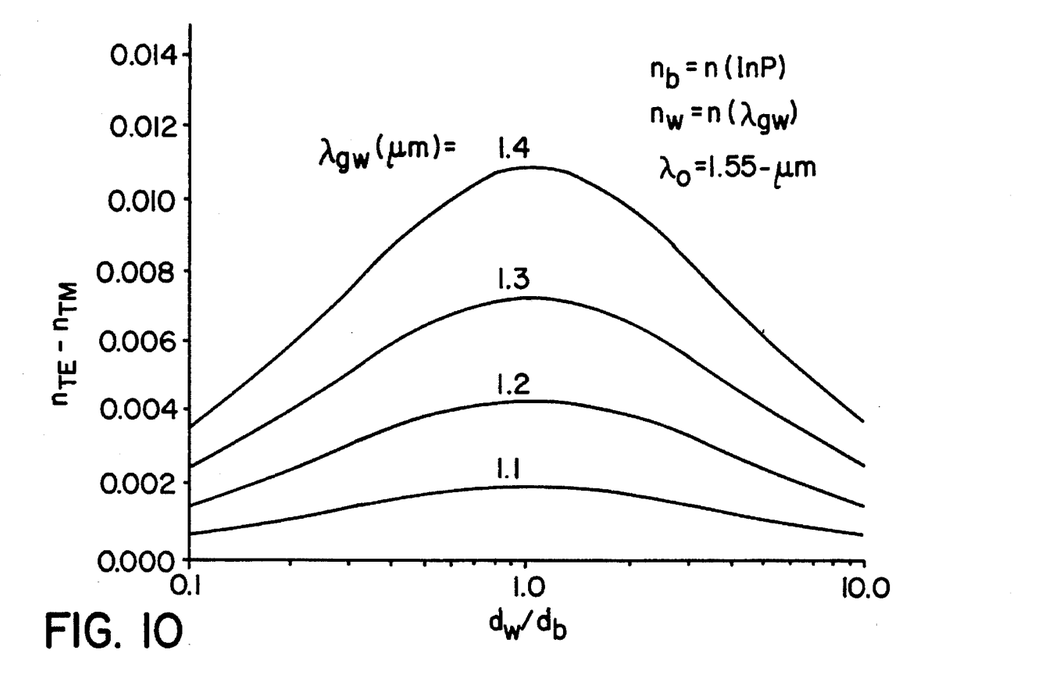
FIG. 10 graphically illustrates n(TE)−n(TM) versus the ratio of quantum well thickness to barrier thickness as a function of quantum well bandgap.

FIGS. 8, 9 and 10 provide graphically details of the effect of quantum well variables on n(TE)–n(TM). In FIG. 8 the abscissa refers to the well thickness in nm, it being understood that the well and barrier have the same thickness. This is plotted for different values of the bandgap composition of the well material. In this particular case the barriers are InP.

In FIG. 9, n(TE)–n(TM) is plotted against central wavelength $\lambda_0$ for the same bandgap values given in FIG. 8. The well and barrier thicknesses are equal and 10 nm. n(TE) represents the same physical parameter as $n^{TE}$; and n(TM) represents the same as $n^{TM}$.

Finally FIG. 10 is a plot of n(TE)–n(TM) against the ratio of well to barrier thickness for different values of bandgap. This establishes that by proper design the material birefringence for the TE and TM modes in the MQW material can be enlarged. This means that the refractive index for TE mode can be increased while the refractive index for the TM mode can be decreased. The required difference between the effective indices of the TE and TM modes as shown in FIG.

7 can be obtained by choosing different combinations of the MQW as plotted in FIG. 10.

Normally, $\beta_0(TE) > \beta_0(TM)$, and for filters made of bulk material, this is the major reason that causes the difference between $K_{TE}$ and $K_{TM}$. The difference of the propagation constants of the TE and TM modes causes the different coupling coefficients for the TE and TM modes. By using multi-quantum-wells in the coupling layer where $n_3(TE) > n_3(TM)$, it is possible to make $\gamma_3(TE) < \gamma_3(TM)$.

From the equations for K(TE) and K(TM) previously given it will be apparent that the MQW coupling layer given above can be used to compensate the $\beta_0(TE) > \beta_0(TM)$ effect and lead to the situation wherein:

$$K_{TE}(\lambda_0) = K_{TM}(\lambda_0)$$

Thus the conditions previously specified for complete coupling of both TE and TM modes from one waveguide to the other can be satisfied through a combination of geometrical selection, compositional tailoring, and birefringence compensation.

Referring again to FIGS. 2, 3 and 4, it may be understood that with the structure of FIG. 2, i.e., two waveguides where both may be bulk material or one bulk and one with MQW, the first condition can be satisfied, i.e., $$\lambda_0 = \lambda_0^{TM}.$$

The structure in which one guide is bulk and the other includes a MQW satisfied both the first and second conditions, i.e., $$\lambda_0^{TE} = \lambda_0^{TM}$$

and $$\Delta\lambda_{BW}(TE) = \Delta\lambda_{BW}(TM).$$

Finally the structure of FIG. 4 with an MQW in the coupling layer and one or both guiding layers satisfies all three conditions.

Figure 5:
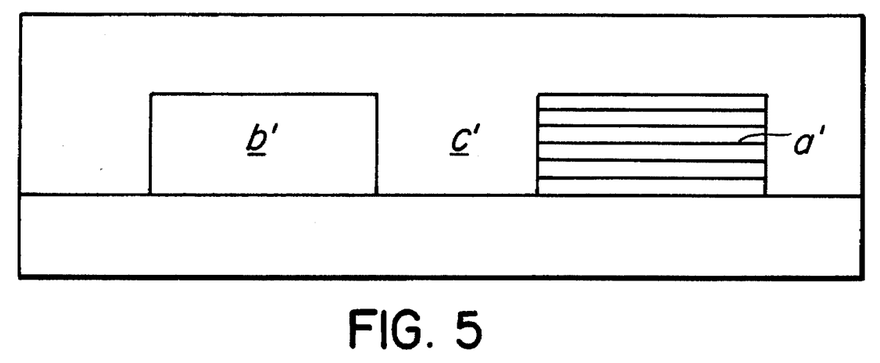
FIG. 5 is a perspective view of an alternate embodiment showing laterally coupled waveguides.

While a particular embodiment of the invention has been described and illustrated it will be apparent that variations and alternatives to the described structure can be implemented. For example the MQW can be used in just the coupling layer, or in one or both waveguides and/or in the cladding layers, or in both the coupling layer and one/both waveguide(s) layer(s). In the foregoing illustrated description the guiding layers are vertically coupled through the intermediate coupling layer. The invention, however, is not limited to a vertically coupled structure but encompasses laterally coupled devices as well. To this end FIG. 5 represents a laterally coupled device wherein guiding layers a' and b' are separated laterally by coupling region c'. Through specially designed growth techniques as described in Applicant's co-pending U.S. patent application. Ser. No. 08/292,206 filed 18 Aug. 1994 (incorporated herein by reference), the same combinations of bulk and MQW waveguide/coupling layer as described in relation to vertically coupled structures may be realized. It is also within the scope of the present invention to assist coupling effects between waveguides by including a grating in association with one or both waveguides. Such a grating can assist the coupling of light in the two waveguides travelling in the same direction (co-directional coupler), or in a different direction (contra-directional coupler), based on the choice of the grating period. It is to be understood, however, that such alternatives come within the scope of the invention as defined in the following claims.

I claim:

1. A polarization independent wavelength tunable filter comprimising:
   a first waveguide for receiving an optical signal on at least one wavelength carrier, said wavelength carrier including TM and TE polarization modes;
   a second waveguide, spaced from said first waveguide for receiving from said first waveguide said at least one wavelength carrier including both TM and TE polarization modes; and
   a coupling region between and integral with said first and second waveguides wherein the physical characteristics of said waveguides and said coupling region are selected so as to facilitate effective coupling of said wavelength carrier and both TM and TE polarization modes from said first waveguide to said second waveguide.

2. The tunable filter as defined in claim 1, said optical signal comprising a plurality of wavelength carriers, only a selected one of said plurality of wavelength carriers being coupled to said second waveguide.

3. A semiconductor polarization independent wavelength tunable filter comprising:
   a first waveguide for receiving and propagating therethrough an optical signal containing a plurality of discrete wavelength carriers each having TM polarization mode and TE polarization mode;
   a second waveguide having at least a portion thereof in juxtaposition to said first waveguide, said second waveguide for selectively receiving from said first waveguide one of said plurality of discrete wavelength carriers; and
   a coupling region between and integral with said first and second waveguides wherein the geometrical configurations of said waveguides, the compositional ratio of said semiconductor and the birefringence in said first and second waveguides and said coupling region are selected so as to effectively couple said one discrete wavelength carriers and said TE and TM polarization modes from said first waveguide to said second waveguide.

4. A tunable filter as defined in claim 2, said waveguides and said coupling region fabricated from semiconductor material.

5. A tunable filter as defined in claim 2, said waveguides and said coupling region fabricated from a polymer.

6. A tunable filter as defined in claim 2, said waveguides and said coupling region fabricated from a glass material.

7. A tunable filter as defined in claim 2, said waveguides and said coupling region fabricated from an photorefractive material.

8. A tunable filter as defined in claim 7, said photorefractive material being $LiNbO_3$.

9. A tunable filter as defined in claim 2, said waveguides and said coupling region fabricated from an electrorefractive material.

10. A tunable filter as defined in claim 4, said semiconductor material being a II-VI alloy.

11. A tunable filter as defined in claim 4, said semiconductor material being Si/Ge.

12. A tunable filter as defined in claim 4, said semiconductor material being III-V alloys.

13. A tunable filter as defined in claim 12, said III-V alloy being InGaAsP/InP.

14. A tunable filter as defined in claim 12, said physical characteristics including the geometry of said waveguides and coupling region.

15. A tunable filter as defined in claim 12, said physical characteristic including the compositional ratio of said III-V alloys.

16. A tunable filter as defined in claim 12, said physical characteristics including birefringence compensation.

17. A tunable filter as defined in claim 13, the first and second waveguides being in vertically stacked epitaxial layers separated by a coupling layer.

18. A tunable filter as defined in claim 13, said first and second waveguides being laterally coupled through an intermediate planar coupling region.

19. A tunable filter as defined in claim 17, said coupling layer including multi-quantum-wells.

20. A tunable filter as defined in claim 19, one of said first or second waveguides including multi-quantum-wells.

21. A tunable filter as defined in claim 18, said coupling region including multi-quantum-wells.

22. A tunable filter as defined in claim 21, one of said waveguides including multi-quantum-wells.

23. A tunable filter as defined in claim 2, said coupling being assisted by a grating on one of said first and second waveguides.

* * * * *